May 5, 1970  E. N. AVERY  3,509,716
SOLAR ENERGY THERMODYNAMIC MOTOR
Original Filed Sept. 5, 1967

INVENTOR:
EDWARD N. AVERY
BY Howson & Howson
ATTYS.

United States Patent Office 3,509,716
Patented May 5, 1970

3,509,716
SOLAR ENERGY THERMODYNAMIC MOTOR
Edward N. Avery, 201 N. Grove St.,
Dunmore, Pa. 18512
Original application Sept. 5, 1967, Ser. No. 665,618, now Patent No. 3,441,482, dated Apr. 29, 1969. Divided and this application Jan. 14, 1969, Ser. No. 790,916
Int. Cl. F03g 3/00
U.S. Cl. 60—10                                                5 Claims

ABSTRACT OF THE DISCLOSURE

In apparatus for purification of impure water by humidification using solar energy as a heat source, comprising: an impure water heating pool covered by a material to prevent water evaporation therefrom while promoting absorption of solar energy into the heating pool, and a solar energy still; a rotary thermodynamic motor to circulate the impure water between the pool and the still. The motor consists of a framework with a plurality of arcuate tanks positioned about the circumference. Diagonally opposite pairs of tanks are interconnected by conduits to effect transfer of volatile liquid from the lower tank to the upper tank as a result of the heat energy supplied to the lower tanks by the pool water. The transfer of the volatile liquid effects rotation of the framework.

---

This application is a division of my co-pending application Ser. No. 665,618 filed Sept. 5, 1967, now U.S. Pat. No. 3,441,482.

The present invention relates to a thermodynamic motor which is adapted to use solar energy to effect rotation, and may have particular application in humidification apparatus for recovering pure water from impure water.

Many attempts have been made for utilizing solar energy to drive mechanical apparatus, but none has been entirely satisfactory because of the difficulties in converting oscillating motion to rotary motion and in obtaining efficient operation thereof.

The present invention provides an improved thermodynamic motor in which the construction is relatively simple so as to provide continuous rotation of the motor under an impetus gained from temperature differential arising from the effective use of solar energy.

More specifically the present invention provides for the utilization of solar energy to heat water in a pool and the use of the heated water from the pool to provide a temperature differential between tanks at diametrically opposite sides of a rotary framework to draw a volatile liquid from the lower tank to an upper tank, the transfer of the mass of the liquid creating an unbalance which rotates the framework, which therefore operates as a motor.

With the foregoing in mind, a primary object of the present invention is to provide an improved thermodynamic motor which converts solar energy into rotational forces.

More specifically the present invention provides a motor of simplified construction which is rotated continuously by heat energy which provides a temperature differential between arcuate tanks at diametrically opposite sides of a rotary framework, and which effects transfer of a volatile liquid against the forces of gravity.

Other objects and a fuller understanding of the invention may be had by referring to the following description and claims taken in conjunction with the accompanying drawings wherein:

FIG. 1 illustrates a solar energy water purification installation having a heating pool filled with saline or other impure water, a solar-energy still with an oscillating thermodynamic motor to promote water vaporization in the still, and a rotary thermodynamic motor to circulate the water through a canal between the pool and the still.

Figure 1:
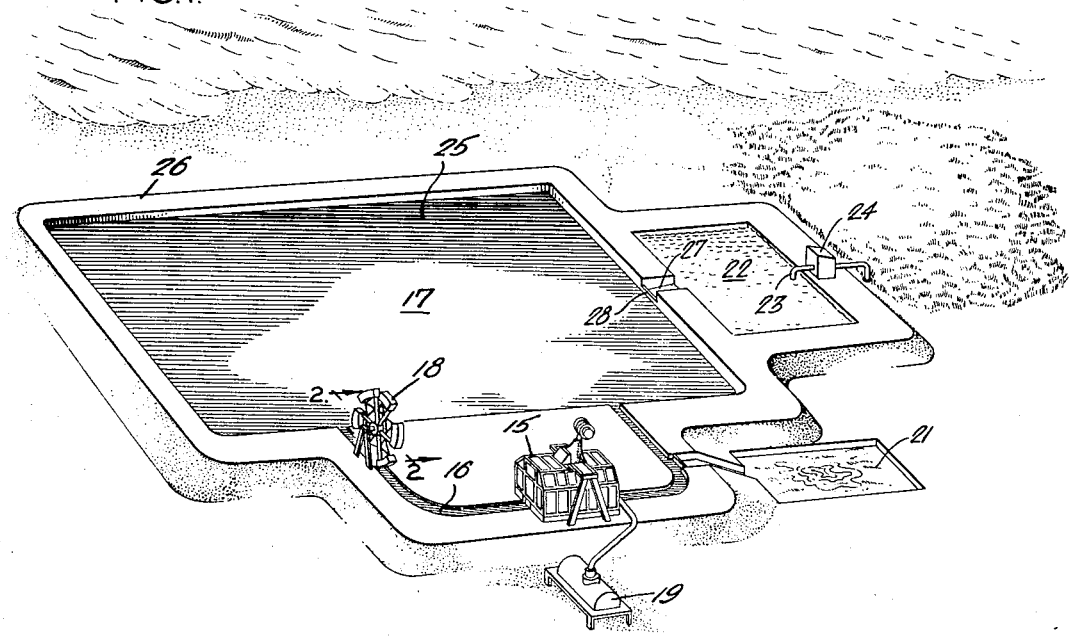
FIG. 1 is a perspective view of a solar energy water purification installation embodying a thermodynamic motor of the present invention.

As illustrated in FIG. 1, a still 15 is mounted in a canal 16 having impure water flowing therethrough from a pool 17. In the present instance, the canal is U-shaped with the still 15 mounted in the base of the U. A rotary thermodynamic motor 18 in accordance with the present invention circulates the water through the canal 16, in the inlet leg of the canal. A portion of the water circulating through the canal 16 is evaporated in the still and is condensed and collected in a reservoir, for example a tank 19 adjacent the still. The evaporation of the pure water from the canal raises the concentration of impurities in the return leg of the canal downstream of the still 15 and a sump 21 is provided adjacent the return leg of the canal 16 to draw off the water with concentrated impurities from the canal. Means is provided to supply water to the pool to make up for the evaporated water collected in the reservoir 19 and the water discharged into the sump 21. In the present instance the water supply includes a settling basin 22 and a supply line 23 having means 24 responsive to the water level in the basin to maintain it full.

As set forth in my patent, the purification installation operates without substantial use of electricity or other generated power, and, when conditions permit, may generate useful power. Such generated power may be stored for use in operating the installation when the climatic conditions are unfavorable, or may be used for other purposes as desired. The primary source of power for operating the installation is solar energy and such other natural sources of power that are available. In the present instance, solar energy is used to elevate the temperature of the water in the pool 17, preferably to a temperature substantially above ambient temperature so that there is a substantial temperature gradient between the ambient temperature and the water temperature in the pool. The efficiency of the pool is further enhanced if a source of hot water is available, as for example from a hot spring. The illustrated installation is designed to employ shallow sources of water so as to reduce the amount of heating required in the pool 17.

The pool 17 is of a substantial area so as to have a large surface exposed to the radiant energy of the sun. To enhance the heating effect of the sun, a suitable cover means is provided over the pool's surface. It has been found that an efficient covering may be a continuous film of dark oil or other suitable film-forming liquid having a density less than that of water and having heat-asorbing properties. The film-forming characteristic of the covering liquid film 25 prevents substantial evaporation of the water underlying the film, and the heat-absorbing character of the film transmits the radiant solar energy to raise the temperature of the water. Where the size of the pool permits, the covering film may be a plastic material such as dark-colored polyethylene sheeting floated on the water and anchored at its edges to the inner walls of the foundation through the inner walls of the pool. If a solid film of this character is employed, means is provided to collect rain water from the surface thereof for transmission directly to the reservoir 1. If it is impractical to use a film as a heat-transmitting cover, floating cover elements such as barges may be used to transmit the solar heat energy into the pool and retard evaporation therefrom.

In the present instance, the pool 17 is formed by a poured concrete foundation 26, but earthen foundations having water-impervious linings may be used. The foundation 26 is provided with a weir 27 to admit surface water from the settling basin 22 into the pool 17, a barrier 28 being provided to prevent the migration of the oil film from the pool 17 into the settling basin. The weir is relatively shallow to insure that warmer surface water flows from the settling basin 22 into the pool. The barrier terminates at its lower end above the bottom of the weir 27 to afford flow of water from the basin 22 into the pool 17. Since the supply has means 24 to keep the basin 22 filled, the weir 27 maintains the pool 17 at the desired level.

Figure 3:
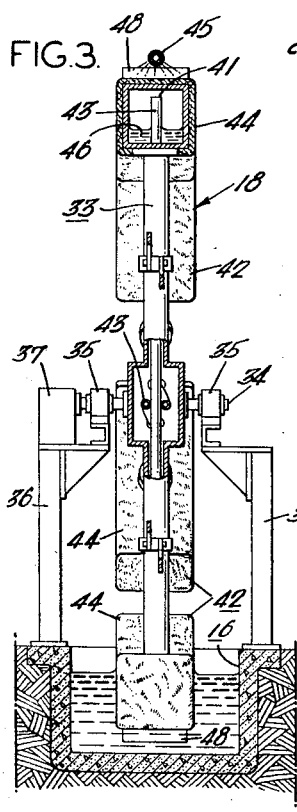
FIG. 3 is a sectional view taken along the line 3—3 of FIG. 2.
Figure 2:
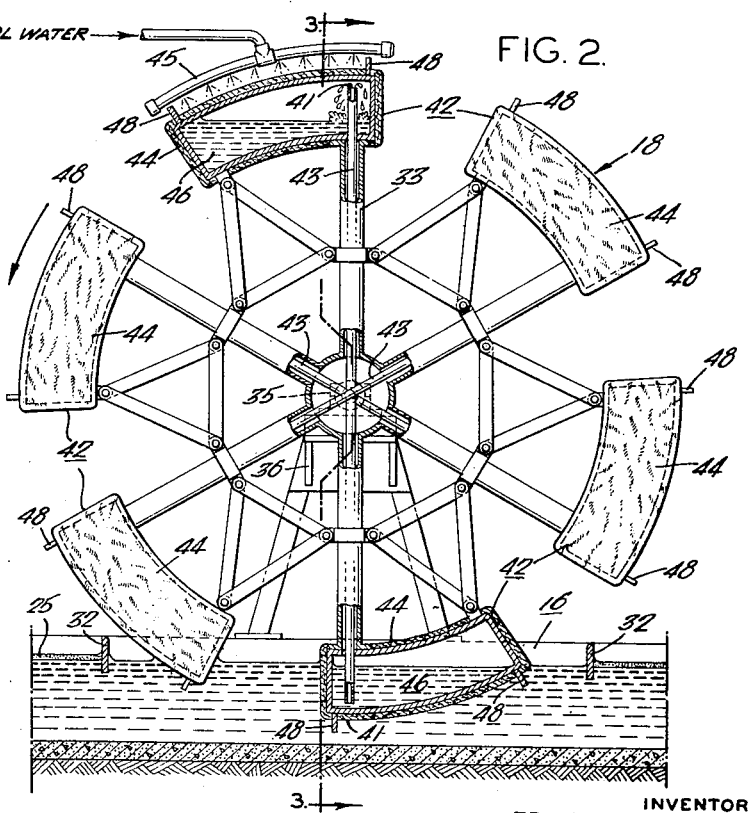
FIG. 2 is an enlarged sectional view taken along the line 2—2 of FIG. 1 showing the rotary thermodynamic motor to circulate the water through the canal.

As pointed out above, water from the pool 17 is circulated through the canal 16 to supply the still 15, in accordance with the present invention the circulation being effected by a thermodynamic motor 18. As shown in FIG. 2, the covering film 25 in the canal 16 is interrupted in the area of the motor 18 for example by barriers 32 positioned upstream and downstream respectively of the motor. As shown in FIGS. 2 and 3, the motor 18 comprises a rotary framework 33 having an axle 34 mounted for rotation in bearings 35 supported on A-frame supports 36. A power-take-off 37 is connected to the axle 34 through a clutch device (not shown) to utilize excess power generated by the motor 18 when the operating conditions permit it. The clutch is deenergized when the operating conditions are substandard to eliminate the drag of the power-take-off 37 from the axle.

In order to utilize the solar energy, the rotary framework 33 includes a series of tanks 42 positioned about the circumference of the framework. In the present instance, the tanks are arcuate in form having a curvature corresponding to the radius of the framework and diagonally opposite pairs of tanks are interconnected by conduits 43 extending through the framework 33 and having open ends 41 adjacent the outer arcuate walls of each tank at the trailing end thereof, reckoned in the direction of rotation of the framework. In the present instance, to increase the efficiency of the motor, the tanks are coated with an absorbent material as indicated at 44 and a spray manifold 45 is positioned adjacent the top of the rotary structure 33 to spray cool water onto the surface of the tank.

In accordance with the invention, a volatile liquid 46 is contained in the tanks to transform the solar energy into useful work. To this end, as shown in FIG. 2, the volume of the volatile liquid 46 within two interconnected tanks is approximately equal to the volume in one of the tanks so as to leave a vapor space above the liquid approximately equal to the liquid volume.

In operation, the volatilization of the liquid in the lower tank of each pair creates a vapor pressure within the lower tank which drives the liquid from the lower tank to the upper tank. The increased volume of liquid in the upper tank partially fills the tank creating an unbalance which causes the framework 33 to rotate slowly counterclockwise as shown in FIG. 2. The volatilization of the liquid 46 in the lower tank is produced by the elevated temperature of the water in the canal 16 which, in turn, raises the temperature of the liquid and increase its vapor pressure. In order to insure as warm a temperature as possible in the inlet leg of canal 16, the canal is relatively shallow at its inlet and gradually deepens towards the return end. In the top tank, the spray manifold 45 cools the tank and the liquid therein to reduce its vapor pressure thereby further assisting the upward flow of liquid from the lower tank to the upper tank. As the framework 33 rotates counterclockwise, the tank at the bottom rotates out of the water in the canal 16 and the upper passes out of registry with the spray manifold 45. There is still a considerable temperature differential between the upper and lower tanks due to the absorption of the cold water by the coating on the upper tank and the warm water by the coating on the lower tank. This temperature differential maintains the upward flow of the liquid 46 for a limited period until the evaporative cooling of the absorbed water eliminates the temperature differential. At this time, both tanks have been rotated past the horizontal level of the axle 34 so that the ends 41 of the conduit 43 are above the level of the liquid in both the upper and lower tanks thereby permitting vapor flow between the two tanks to equalize the pressures therein. Further rotation of the framework 33 rotates the downwardly moving tanks into the heated water in the canal 16 and the upwardly moving tank into the registry with the spray manifold 44 thereby completing one-half cycle of the motor. Thus the thermodynamic motor utilizes the pressure differentials produced by a volatile liquid to cause the liquid to flow upwardly against gravity whereupon the weight of the liquid at its elevated level produces the rotational force to drive the framework.

The choice of a volatile liquid to be used in the tanks 42 depends primarily upon the vertical height and the temperature difference between the opposed tanks which are connected in pairs. Methylene chloride, or one of the fluorinated hydrocarbons used as refrigerants such as dichloro-tetrafluoro-ethane, dichloro-difluoro-methane or monochloro-difluoro-methane might be used. Propane or even water may be used as a satisfactory volatile liquid under certain operating conditions. Volatile liquids having substantial pressure differentials for small temperature differences are preferred, and commercial tables are readily available to assist in the selection of such liquids.

Depending upon the atmospheric conditions surrounding the motor, the availability of a cool water supply, and the operating characteristics of the volatile liquid will determine the advisability of providing the absorbent coating 44 on the tanks 42 and using the cool water spray manifold 45. For example where the impurities in the pool and canal water consist of a large concentration of chemical impurities, which may tend to accumulate in the absorbent coating 44 the coating should be eliminated. To provide for retention of the water on the surface of the tank, the surface may be etched or sandblasted to cause the tank surface to act in the nature of a wick to retain the water thereon.

The rotation of the motor 18 through the canal causes the water in the canal 16 to flow or circulate therethrough. As illustrated, the counterclockwise rotation of the rotor's framework 33 produces left to right circulation of the water in the canal 16. To further enhance a pumping effect of the motor 18, radial fins 48 are provided on the outer walls of the tanks 42.

Pure water is recovered from the canal in the still 15 and is transferred to the reservoir 19 by means of a discharge tube mounted at the right-hand side of the still as shown and described in detail in my patent.

While a particular embodiment of the present invention has been herein illustrated, it is not intended to limit the invention to such disclosure, but changes and modifications may be made therein and thereto, as will be apparent to those skilled in the art.

I claim:

1. A thermodynamic motor comprising a support, an axle mounted for rotation on said support, at least two pairs of tanks, means mounting said tanks in spaced relationship on said axle, the tanks in each pair being in oppositely disposed relationship about said axle, a transfer tube interconnecting said tanks in said pair, a volatile liquid substantially filling at least one tank of each pair of tanks, and means to effect a temperature differential between the tanks to cause the said volatile liquid in the lower tank at the bottom of its travel to transfer through said transfer tube to the upper tank to thereby shift the center of gravity of each of said pair of tanks and volatile liquid about said axle to cause rotation thereof, said means to effect a temperature differential comprising a body of heated water underlying said axle and adapted to heat each tank at the bottom of its travel, and a spray manifold to spray water upon each of said tanks when it is in its upper position to cool the same and increase said temperature differential and including an absorbent material on the outside surface of said tanks wherein said absorbent material receives water from said spray manifold and said water evaporates from said material to further cool said tank.

2. A thermodynamic motor as in claim 1, wherein each tank is arcuate-shaped and said transfer tube is connected to one end of said tank, whereby said liquid enters said tank when in said upper position and flows toward the other end of said tank to create a turning moment about said axle.

3. A thermodynamic motor as in claim 1, including a power takeoff unit connected to said axle to receive rotary power therefrom.

4. A motor according to claim 1, said body of heated water comprises a pool and a canal connected at opposite ends to said pool, said tanks rotating through said canal at the bottom of their travel to effect circulation of heated water through said canal.

5. A motor as in claim 4 including fin means extending radially from said tanks to enhance circulation of the heated water which is effected by the passage of the tank in its travel therethrough.

References Cited

UNITED STATES PATENTS

| | | | |
|---|---|---|---|
| 242,454 | 6/1881 | Iske et al. | 60—10 |
| 206,108 | 7/1878 | Hill et al. | 62—316 |
| 243,909 | 7/1881 | Iske et al. | 60—10 |
| 250,265 | 10/1881 | Landis | 60—10 |
| 389,515 | 9/1888 | Iske | 60—10 |
| 3,362,186 | 1/1968 | Patterson | 62—316 |

CARROLL B. DORITY, JR., Primary Examiner

U.S. Cl. X.R.

60—25